United States Patent
Lee et al.

(10) Patent No.: US 10,126,951 B2
(45) Date of Patent: Nov. 13, 2018

(54) APPARATUS AND METHOD FOR PROCESSING DATA SAMPLES WITH DIFFERENT BIT WIDTHS

(71) Applicant: MEDIATEK INC., Hsin-Chu (TW)

(72) Inventors: Kun-Bin Lee, Taipei (TW); Tung-Hsing Wu, Chiayi (TW); Yi-Hao Wu, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 49 days.

(21) Appl. No.: 14/905,970

(22) PCT Filed: Jun. 16, 2015

(86) PCT No.: PCT/CN2015/081543
§ 371 (c)(1),
(2) Date: Jan. 19, 2016

(87) PCT Pub. No.: WO2015/192765
PCT Pub. Date: Dec. 23, 2015

(65) Prior Publication Data
US 2016/0154583 A1    Jun. 2, 2016

Related U.S. Application Data

(60) Provisional application No. 62/012,520, filed on Jun. 16, 2014.

(51) Int. Cl.
*G06F 3/06* (2006.01)
*G06F 5/00* (2006.01)
*G06F 13/16* (2006.01)

(52) U.S. Cl.
CPC ............ *G06F 3/061* (2013.01); *G06F 3/0631* (2013.01); *G06F 3/0644* (2013.01);
(Continued)

(58) Field of Classification Search
CPC ...... G06F 3/061; G06F 3/1689; G06F 3/0631; G06F 3/0644; G06F 3/06731; G06F 5/00; Y02B 6/1228
See application file for complete search history.

(56) References Cited

U.S. PATENT DOCUMENTS 5,909,588 A    6/1999 Fujimura
6,026,198 A *  2/2000 Okada ..................... G06T 9/005
                                                    341/107
(Continued)

FOREIGN PATENT DOCUMENTS

CN    101923523 A    12/2010
JP    200662132 A     3/2006
(Continued)

OTHER PUBLICATIONS

"International Search Report" dated Aug. 18, 2015 for International application No. PCT/CN2015/081543, International filing date:Jun. 16, 2015.

*Primary Examiner* — Nanci N Wong
(74) *Attorney, Agent, or Firm* — Winston Hsu

(57) ABSTRACT

A data processing apparatus includes a storage element and a clock controller. The storage element has storage partitions, including a first storage partition and a second storage partition. The clock controller controls clock driving of the first storage partition and the second storage partition. When a processing circuit is configured to operate in a first condition to process a first data sample with a first bit width, the clock controller enables clock driving of both of the first storage partition and the second storage partition. When the processing circuit is configured to operate in a second condition to process a second data sample with a second bit width, the clock controller enables clock driving of the first storage partition and disables clock driving of the second storage partition.

8 Claims, 12 Drawing Sheets

(52) U.S. Cl.
CPC .............. *G06F 3/0673* (2013.01); *G06F 5/00* (2013.01); *G06F 13/1689* (2013.01); *Y02B 60/1228* (2013.01); *Y02D 10/14* (2018.01)

(56) References Cited

U.S. PATENT DOCUMENTS

| | | | |
|---|---|---|---|
| 2002/0099680 A1 | 7/2002 | Usami | |
| 2002/0118567 A1* | 8/2002 | Takagi | G11C 7/1036 365/185.11 |
| 2004/0255072 A1* | 12/2004 | Kiris | G06F 13/4018 710/306 |
| 2005/0083774 A1* | 4/2005 | Cao | G11C 7/1078 365/233.1 |
| 2012/0233498 A1* | 9/2012 | Ramaraju | G06F 11/1064 714/23 |
| 2013/0290760 A1* | 10/2013 | Cooper | G06F 1/32 713/323 |
| 2015/0127890 A1* | 5/2015 | Brainard | G06F 13/1694 711/103 |

FOREIGN PATENT DOCUMENTS

| | | |
|---|---|---|
| KR | 20020053337 A | 7/2002 |
| WO | 2014/003764 A1 | 1/2014 |

* cited by examiner

APPARATUS AND METHOD FOR PROCESSING DATA SAMPLES WITH DIFFERENT BIT WIDTHS

CROSS REFERENCE TO RELATED APPLICATIONS

This application claims the benefit of U.S. provisional application No. 62/012,520, filed on Jun. 16, 2014 and incorporated herein by reference.

TECHNICAL FIELD

The disclosed embodiments of the present invention relate to signal processing in different modes or different input sources, and more particularly, to an apparatus for processing data samples with different bit widths and a related method thereof.

BACKGROUND

Signal processing of different bit widths (e.g., 8 bits, 10 bits, 12 bits, etc.) is more and more popular in a variety of applications, including a camera, a video encoder, a video decoder, a display device, a graphics processing unit (GPU), etc. Specifically, a procedure may need to process data samples with different bit widths in different modes or different input sources. For example, the procedure may be configured to process first data samples each having a first bit width (e.g., 12-bit data samples) in a first condition, and may be configured to process second data samples each having a second bit width (e.g., 8-bit data samples) in a second condition.

The procedure may be implemented using a processor with a plurality of registers and a plurality of logic gates. Some registers (e.g., control registers) are independent of different bit widths of data samples, while some registers (e.g., data registers) are related to different bit widths of data samples. Suppose that each data register is a 12-bit register. When the processor is configured to process a 12-bit data sample, all bit cells of the 12-bit register are in use. When the processor is configured to process an 8-bit data sample, all bit cells of the 12-bit register are still in use, which may result in waste of memory access bandwidth, memory size requirement or power consumption.

SUMMARY

In accordance with exemplary embodiments of the present invention, an apparatus for processing data samples with different bit widths and a related method thereof are proposed.

According to a first aspect of the present invention, an exemplary data processing apparatus is disclosed. The exemplary data processing apparatus includes a storage element and a clock controller. The storage element has a plurality of storage partitions, wherein the storage partitions comprise a first storage partition and a second storage partition. The clock controller is arranged to control clock driving of each of the first storage partition and the second storage partition. When a processing circuit is configured to operate in a first condition to process a first data sample with a first bit width, the clock controller enables clock driving of both of the first storage partition and the second storage partition. When the processing circuit is configured to operate in a second condition to process a second data sample with a second bit width, the clock controller enables clock driving of the first storage partition and disables clock driving of the second storage partition.

According to a second aspect of the present invention, an exemplary data processing apparatus is disclosed. The exemplary data processing apparatus includes a storage element and a data interface controller. The storage element has a plurality of storage partitions, wherein the storage partitions comprise a first storage partition and a second storage partition. The data interface controller is arranged to control signal transition at a data interface of the second storage partition. When a processing circuit is configured to operate in a first condition to process a first data sample with a first bit width, the data interface controller enables signal transition at the data interface of the second storage partition. When the processing circuit is configured to operate in a second condition to process a second data sample with a second bit width, the data interface controller disables signal transition at the data interface of the second storage partition.

According to a third aspect of the present invention, an exemplary data processing apparatus is disclosed. The exemplary data processing apparatus includes a memory. The memory is arranged to store a plurality of data samples, wherein each of a first data sample and a second data sample is derived from one of the data samples stored in the memory. When a processing circuit is configured to operate in a first condition to process the first data sample with a first bit width, the first data sample includes at least a first data segment derived from a first memory word of the memory and a second data segment derived from a second memory word of the memory, where the first memory word further includes a first data segment of another first data sample with the first bit width, and the second memory word further includes a second data segment of the another first data sample. When the processing circuit is configured to operate in a second condition to process the second data sample with a second bit width, the second data sample is solely derived from a single memory word of the memory, where the single memory word further includes another second data sample with the second bit width.

According to a fourth aspect of the present invention, an exemplary data processing method is disclosed. The exemplary data processing method includes: utilizing a storage element having a plurality of storage partitions, wherein the storage partitions comprise a first storage partition and a second storage partition; when a processing circuit is configured to operate in a first condition to process a first data sample with a first bit width, enabling clock driving of both of the first storage partition and the second storage partition; and when the processing circuit is configured to operate in a second condition to process a second data sample with a second bit width, enabling clock driving of the first storage partition and disabling clock driving of the second storage partition.

According to a fifth aspect of the present invention, an exemplary data processing method is disclosed. The exemplary data processing method includes: utilizing a storage element having a plurality of storage partitions, wherein the storage partitions comprise a first storage partition and a second storage partition; when a processing circuit is configured to operate in a first condition to process a first data sample with a first bit width, enabling signal transition at a data interface of the second storage partition; and when the processing circuit is configured to operate in a second condition to process a second data sample with a second bit width, disabling signal transition at the data interface of the second storage partition.

According to a sixth aspect of the present invention, an exemplary data processing method is disclosed. The exemplary data processing method includes: utilizing a memory to store a plurality of data samples, wherein each of a first data sample and a second data sample is derived from one of the data samples; when a processing circuit is configured to operate in a first condition to process the first data sample with a first bit width, deriving a first data segment of the first data sample from a first memory word of the memory and deriving a second data segment of the first data sample derived from a second memory word of the memory, where the first memory word further includes a first data segment of another first data sample with the first bit width, and the second memory word further includes a second data segment of the another first data sample; and when the processing circuit is configured to operate in a second condition to process the second data sample with a second bit width, deriving the second data sample from only a single memory word of the memory, where the single memory word further includes another second data sample with the second bit width.

According to a seventh aspect of the present invention, an exemplary data processing method is disclosed. The exemplary data accessing method includes: utilizing a storage element having a plurality of storage partitions, wherein the storage partitions comprise a first storage partition and a second storage partition; when a first data sample with a first bit width is accessed, enabling both of the first storage partition and the second storage partition; and when a second data sample with a second bit width is accessed, enabling the first storage partition and disabling the second storage partition.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to provide an innovative design which is capable of reducing the power consumption and/or lowering the memory bandwidth and memory size requirement when a procedure processes data samples with different bit widths. For example, a storage element having a plurality of storage partitions is used, where the storage partitions include a first storage partition and a second storage partition. When a first data sample with a first bit width is accessed, both of the first storage partition and the second storage partition may be enabled. When a second data sample with a second bit width is accessed, the first storage partition may be enabled and the second storage partition may be disabled. Several proposed designs of an apparatus for processing data samples with different bit widths are detailed as below.

Figure 1:
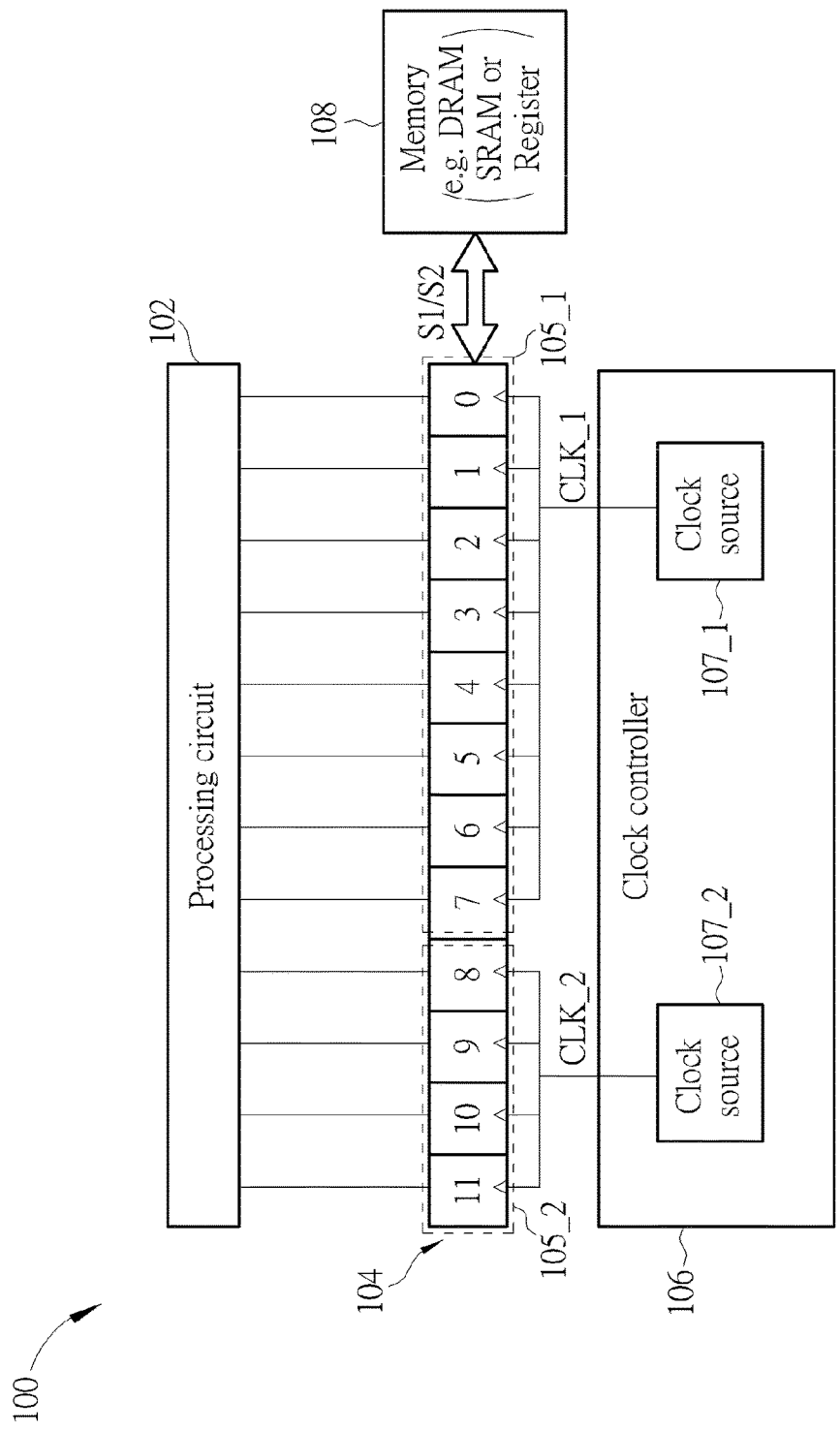
FIG. 1 is a diagram illustrating a first data processing apparatus according to an embodiment of the present invention.

FIG. 1 is a diagram illustrating a first data processing apparatus according to an embodiment of the present invention. For example, the data processing apparatus 100 may be implemented in an electronic device that needs to process data samples with different bit widths, such as a camera, a video encoder, a video decoder, a display device, a GPU, or any other device being able to process data samples with different bit widths. In this embodiment, the data processing apparatus 100 includes, but not limited to, a processing circuit 102, a storage element 104, a clock controller 106, and a memory 108. For better understanding of technical features of the present invention, only one storage element 104 is illustrated in FIG. 1. In practice, the data processing apparatus 100 may have a plurality of storage elements 104. In one exemplary implementation, the processing circuit 102 and the storage element 104 may be part of a processor, where the processing circuit 102 may have a plurality of logic gates, and the storage element 104 may be a register. In another exemplary implementation, the storage element 104 may be a memory unit of an on-chip memory or an off-chip memory. For example, the processing circuit 102 and the storage element 104 may be part of a processor, where the processing circuit 102 may have a plurality of logic gates, and the storage element 104 may be part of a processor cache implemented using a static random access memory (SRAM), register or any other type of memory device.

A signal processing procedure may run on the processing circuit 102 for processing data samples with different bit widths. For example, the signal processing procedure may be used to perform compression/decompression, motion estimation, interpolation, filtering, resizing, and/or texture processing. Hence, the processing circuit 102 may be configured to process a first data sample S1 with a first bit width in a first condition and process a second data sample S2 with a second bit width in a second condition, wherein the first bit width is larger than the second bit width. In the following, it is assumed that the first bit width may be 12 bits and the second bit width may be 8 bits. However, this is for illustrative purposes only, and is not meant to be a limitation of the present invention.

Data bits of the storage element 104 are directly/indirectly loaded from the memory 108 such as dynamic random access memory (DRAM), static random access memory (SRAM), register or any other type of memory device, and then processed by the processing circuit 102. Hence, the first data sample S1 (e.g., one 12-bit data sample) may be directly read from the memory 108 (or may be obtained from a data sample which is read from the memory 108 and then processed by intermediate circuitry between the memory 108 and the storage element 104) and then loaded into the storage element 104 in the first condition (e.g., a 12-bit depth mode), and the second data sample S2 (e.g., one 8-bit data sample) may be directly read from the memory 108 (or may be obtained from a data sample which is read from the memory 108 and then processed by intermediate circuitry between the memory 108 and the storage element 104) and then loaded into the storage element 104 in the second condition (e.g., an 8-bit depth mode).

The storage element 104 may have N bit cells having M storage partitions, where N and M are positive values that may be configured based on actual design consideration. In this embodiment, the storage element 104 may be a 12-bit register having a first storage partition 105_1 composed of 8 less significant bit (LSB) cells and a second storage partition 105_2 composed of 4 most significant bit (MSB) cells. In one alternative design, the storage element 104 may be a 12-bit register having a first storage partition composed of 4 LSB cells and a second storage partition composed of 8 MSB cells. In another alternative design, the storage element 104 may be a 12-bit register having more than two storage partitions. To put it simply, the number of bit cells included in the storage element 104 and the partitioning design of the storage element 104 as shown in FIG. 1 are for illustrative purposes only, and are not meant to be limitations of the present invention.

In this embodiment, the clock controller 106 is arranged to control clock driving of each of the first storage partition (e.g., an LSB storage partition) 105_1 and the second storage partition (e.g., an MSB storage partition) 105_2. In other words, the first storage partition (e.g., an LSB storage partition) 105_1 and the second storage partition (e.g., an MSB storage partition) 105_2 may be active via the clock controller 106 respectively. When the processing circuit 102 is configured to operate in the first condition (e.g., 12-bit depth mode), the clock controller 106 enables clock driving of both of the first storage partition 105_1 and the second storage partition 105_2. When the processing circuit 102 is configured to operate in the second condition (e.g., 8-bit depth mode), the clock controller 106 enables clock driving of the first storage partition 105_1, and disables clock driving of the second storage partition 105_2. For example, the clock controller 106 may have two clock sources 107_1 and 107_2, where the clock source 107_1 is capable of providing a first clock CLK_1, and the clock source 107_2 is capable of providing a second clock CLK_2. However, this is for illustrative purposes only, and is not meant to be a limitation of the present invention. For another example, the first clock CLK1 and the second clock CLK_2 may be provided from a clock controller that uses a single clock source collaborating with a logic gate.

Figure 2:
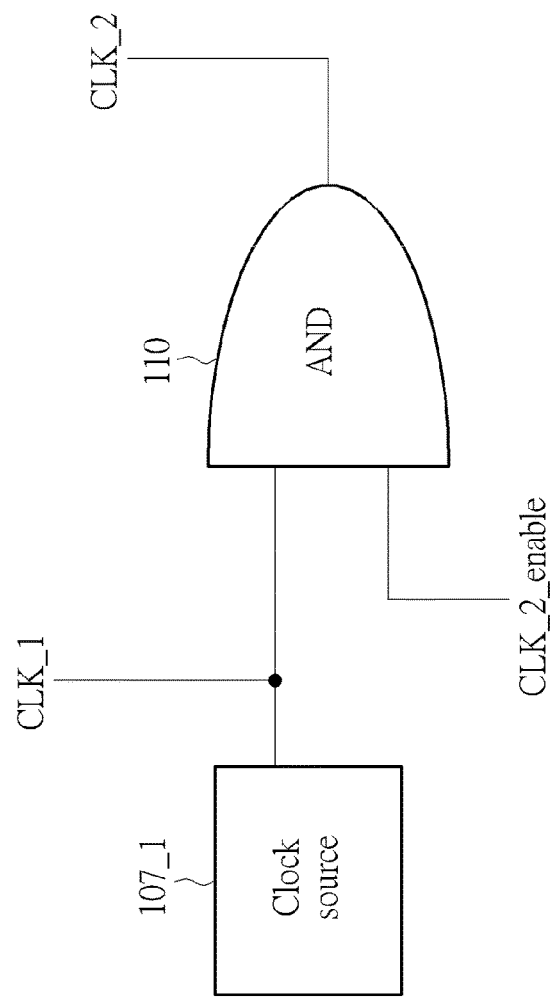
FIG. 2 is a diagram illustrating an alternative design of the clock controller shown in FIG. 1.

FIG. 2 is a diagram illustrating an alternative design of the clock controller 106 shown in FIG. 1. As shown in FIG. 2, a single clock source 107_1 and an AND gate 110 may be implemented in an alternative design of the clock controller 106 for providing multiple clocks. The single clock source 107_1 may be configured to generate the first clock CLK_1 to the first storage partition 105_1. With regard to the AND gate 110, a first input node may be configured to receive the first clock CLK_1 generated from the single clock source 107_1, a second input node may be configured to receive a clock enable signal CLK_2_enable, and an output node may be configured to selectively output the first clock CLK_1 as the second clock CLK_2 according to the clock enable signal CLK_2_enable. For example, the output node of the AND gate 110 may be coupled to the clock source 107_2. In this way, two clock inputs may be provided at the same time through using the same clock source. The AND gate 110 may serve as a clock gating circuit. When the clock enable signal CLK_2_enable is set by a first logic level (e.g., "1"), the AND gate 110 is allowed to output the first clock CLK_1 as the second clock CLK_2, thereby enabling the clock driving of the second storage partition 105_2. When the clock enable signal CLK_2_enable is set by a second logic level (e.g., "0"), the AND gate 110 is blocked from outputting the first clock CLK_1 as the second clock CLK_2, thereby disabling the clock driving of the second storage partition 105_2. To put it simply, the present invention has no limitations on the hardware design of generating the first clock CLK_1 and the second clock CLK_2. Any clock controller design capable of generating multiple clocks (e.g., CLK_1 and CLK_2) and selectively disabling at least one (e.g., CLK_2) of the clocks falls within the scope of the present invention. In some other embodiments, any other method may be utilized to provide two clocks.

With regard to the embodiment shown in FIG. 1, the first storage partition 105_1 is arranged to operate under the first clock CLK_1, and the second storage partition 105_2 is arranged to operate under the second clock CLK_2. It should be noted that the second clock CLK_2 is independent of the first clock CLK_1 due to the fact that the first clock CLK_1 and the second clock CLK_2 are provided from clock sources 107_1 and 107_2 that can be enabled/disabled independently. Hence, when the processing circuit 102 is configured to operate in the first condition, the first clock CLK_1 and the second clock CLK_2 are both active under control of the clock controller 106; and when the processing circuit 102 is configured to operate in the second condition, the first clock CLK_1 is active and the second clock CLK_2 is inactive under control of the clock controller 106. More specifically, the clock source 107_1 enables generation of the first clock CLK_1 in each of the first condition and the second condition; however, the clock source 107_2 enables generation of the second clock CLK_2 in the first condition, but disables generation of the second clock CLK_2 in the second condition.

When the processing circuit 102 is configured to process the first data sample S1 (e.g., 12-bit data sample) in the first condition, all bit cells of the storage element 104 are in use due to the fact that the first clock CLK_1 and the second clock CLK_2 are both active. Specifically, in the first condition, the first storage partition 105_1 and the second storage partition 105_2 are both used to store data bits included in the first data sample S1. In this embodiment, 4 MSB bits of the first data sample S1 are loaded into 4 bit cells of the second storage partition 105_2, respectively; and 8 LSB bits of the first data sample S1 are loaded into 8 bit cells of the first storage partition 105_1, respectively.

When the processing circuit 102 is configured to process the second data sample S2 (e.g., 8-bit data sample) in the second condition, only bit cells of the first storage partition 105_1 are in use due to the fact that the first clock CLK_1 is active and the second clock CLK_2 is inactive. Specifically, in the second condition, only one of the first storage partition 105_1 and the second storage partition 105_2 is used to store data bits included in the second data sample S2. In this embodiment, 8 data bits of the second data sample S2 are loaded into 8 bit cells of the first storage partition 105_1, respectively.

The processing circuit 102 may access data bits in the storage element 104 to perform the intended data processing. When the second clock CLK_2 is inactive in the second condition, each data bit in the second storage partition 105_2 is reset to one predetermined value (e.g., "1" or "0") to ensure that the processing circuit 102 can process the data bits in the first storage partition 105_1 correctly. For example, asynchronous reset may be employed to reset the data bits stored in the second storage partition 105_2 when it is determined that the second clock CLK_2 needed by the second storage partition 105_2 should be controlled to be inactive for the processing of the second data sample S2 in the first storage partition 105_1. In other words, the data bits stored in the second storage partition 105_2 are reset at the absence of the second clock CLK_2. For another example, synchronous reset may be employed to reset the data bits stored in the second storage partition 105_2 when it is determined the second clock CLK_2 needed by the second storage partition 105_2 should be controlled to be inactive for the processing of the second data sample S2 in the first storage partition 105_1. In other words, the data bits stored in the second storage partition 105_2 are reset at the presence of the second clock CLK_2. In some embodiments, the first clock CLK_1 and the second clock CLK_2 may be enabled, and then the data bits stored in the first storage partition 105_1 and the second storage partition 105_2 are reset. After the synchronous reset is done, the clock controller 106 disables the clock source 107_2 to make the second clock CLK_2 become inactive. Next, the data processing apparatus 200 enters the second condition to process the second data sample S2 in the first storage partition 105_1.

Since the clock source 107_2 used to provide the second clock CLK_2 and associated clock tree used to deliver the second clock CLK_2 to the second storage partition 105_2 are inactive, power consumption of related circuit, especially a clock related circuit, can be reduced. Further, since the second clock CLK_2 is inactive, the output data bits of the second storage partition 105_2 are stable without any signal transition. Therefore, power consumption of the fan-out (or load) of these bit cells in the second storage partition 105_2 can be reduced.

In the embodiment shown in FIG. 1, two independent clocks are controlled by the clock controller 106, where one of the independent clocks is disabled in the second condition to save power consumption. Alternatively, the same objective of reducing the power consumption in the second condition may be achieved by using a clock gating technique. In some other embodiments, the first storage partition 105_1 and the second storage partition 105_2 may be active via other methods (for example, a power controller, an electrical connection controller or other means for controlling active status of the first storage partition 105_1 and the second storage partition 105_2) respectively, which should not be limited in this disclosure.

Figure 3:
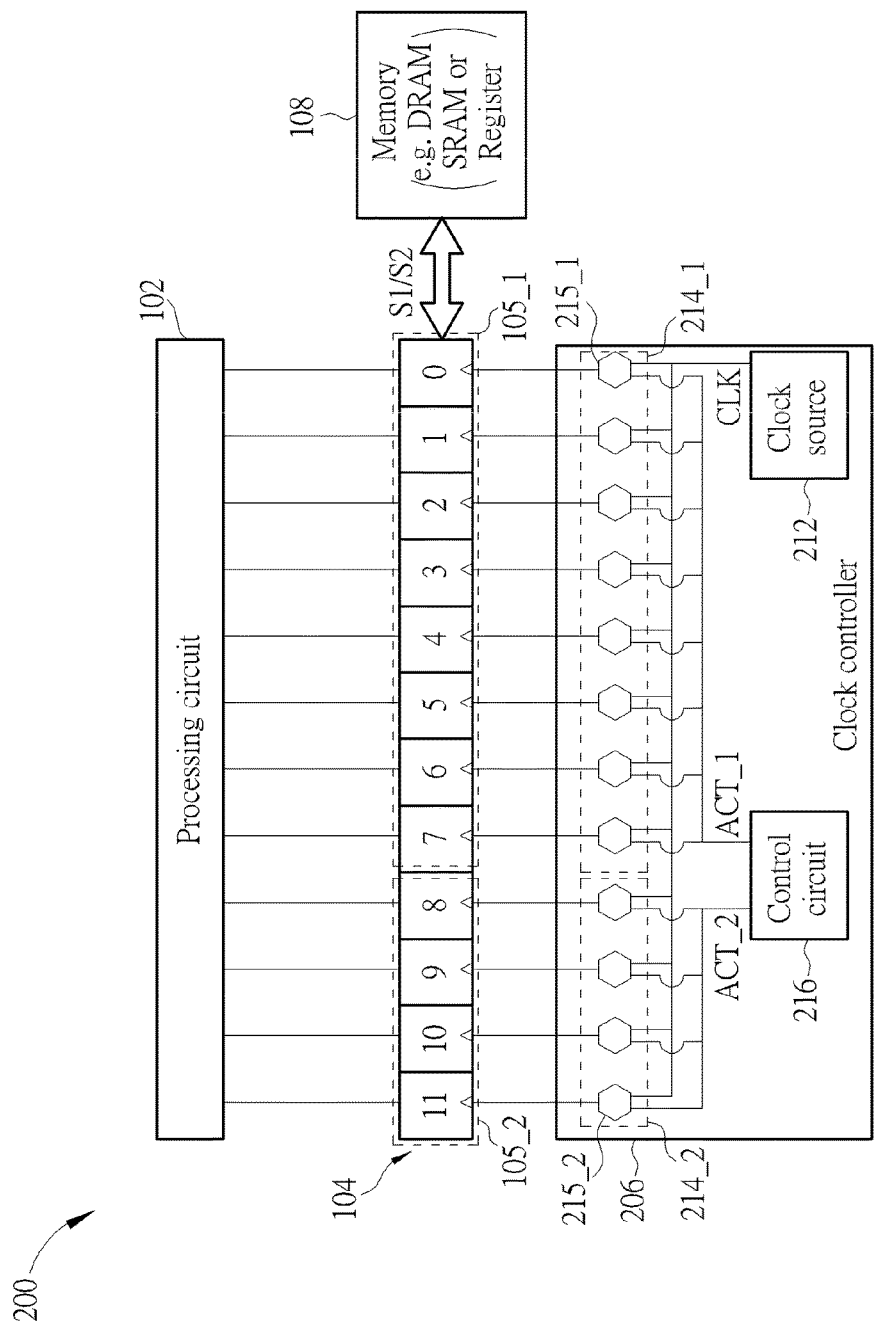
FIG. 3 is a diagram illustrating a second data processing apparatus according to an embodiment of the present invention.

FIG. 3 is a diagram illustrating a second data processing apparatus according to an embodiment of the present invention. For example, the data processing apparatus 200 may be implemented in an electronic device that needs to process data samples with different bit widths, such as a camera, a video encoder, a video decoder, a display device, a GPU, or any other device being able to process data samples with different bit widths. In this embodiment, the data processing apparatus 200 includes a clock controller 206 and the aforementioned processing circuit 102, storage element 104, and memory 108. The major difference between the data processing apparatuses 100 and 200 is the clock controller design. As shown in FIG. 3, the clock controller 206 includes a clock source 212, a first clock gating circuit 214_1, a second clock gating circuit 214_2, and a control circuit 216. The clock source 212 generates a single clock CLK to each of the first clock gating circuit 214_1 and the second clock gating circuit 214_2. The first clock gating circuit 214_1 is arranged to receive the single clock CLK, and selectively supply the received single clock CLK to the first storage partition (e.g., LSB storage partition) 105_1 according to a first control signal ACT_1 generated from the control circuit 216. The second clock gating circuit 214_2 is arranged to receive the same single clock CLK, and selectively supply the received single clock CLK to the second storage partition (e.g., MSB storage partition) 214_2 according to a second control signal ACT_2 generated from the control circuit 216. When the processing circuit 102 is configured to operate in the first condition, the control circuit 216 sets the first control signal ACT_1 for allowing the received single clock CLK to be supplied to the first storage partition 105_1, and sets the second control signal ACT_2 for allowing the received single clock CLK to be supplied to the second storage partition 105_2. When the processing circuit 102 is configured to operate in the second condition, the control circuit 216 sets the first control signal ACT_1 for allowing the received single clock CLK to be supplied to the first storage partition 105_1, and sets the second control signal ACT_2 for blocking the received single clock CLK from being supplied to the second storage partition 105_2.

Similarly, when the clock needed by the second storage partition 105_2 is gated by the second clock gating circuit 214_2 in the second condition, each data bit stored in the second storage partition 105_2 is reset to one predetermined value (e.g., "1" or "0") to ensure that the processing circuit 102 can process the data bits in the first storage partition 105_1 correctly. For example, one of asynchronous reset and synchronous reset may be employed to reset the data bits in the second storage partition 105_2 when it is determined that the clock needed by the second storage partition 105_2 should be gated for the processing of the second data sample S2 in the first storage partition 105_1.

In this embodiment, the first clock gating circuit 214_1 has a plurality of clock gating units 215_1, each controlled by the first control signal ACT_1; and the second clock gating circuit 214_2 has a plurality of clock gating units 215_2, each controlled by the second control signal ACT_2. For example, each of the clock gating units 215_1, 215_2 may be implemented using a logic gate such as an AND gate or a NAND gate.

Since an associated clock tree used to deliver the clock CLK to the second storage partition 105_2 is inactive in the second condition, power consumption of related circuit, especially a clock related circuit, can be reduced. Further, since the clock needed by the second storage partition 105_2 in inactive in the second condition, the output data bits of the second storage partition 105_2 are stable without any signal transition. Therefore, power consumption of the fan-out (or load) of these bit cells in the second storage partition 105_2 can be reduced.

Figure 4:
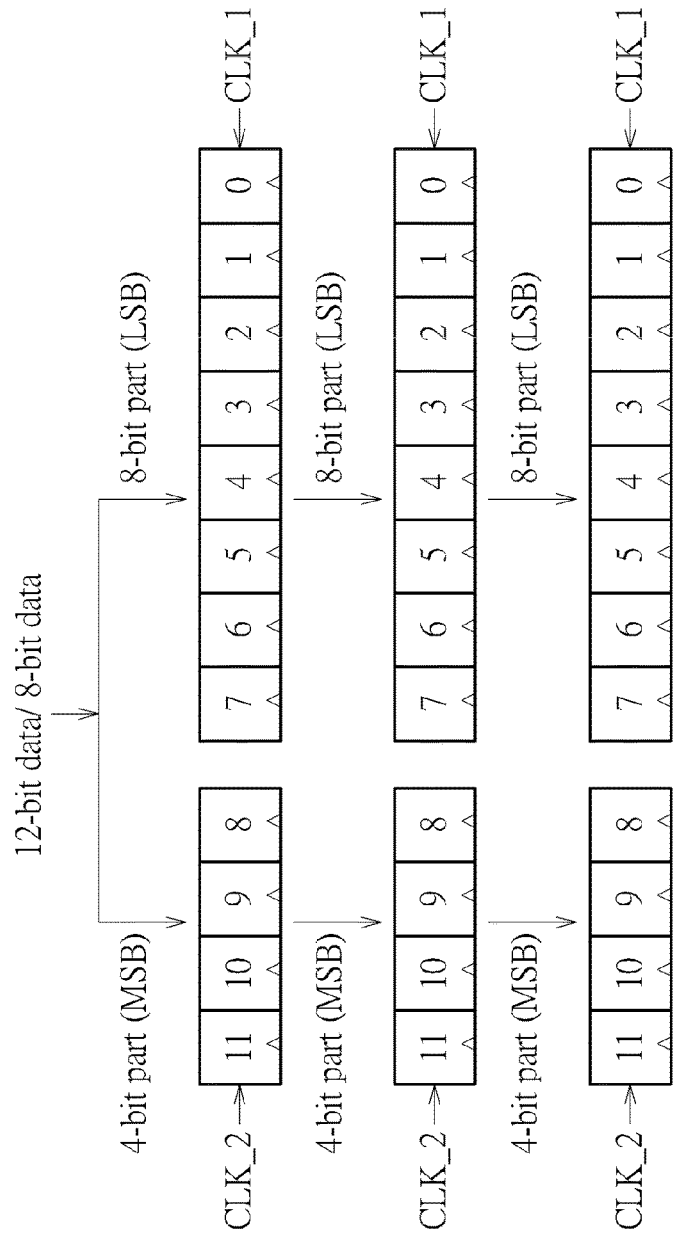
FIG. 4 is a diagram illustrating a first application using the proposed hardware design.

FIG. 4 is a diagram illustrating a first application using the proposed hardware design. A data shifter circuit (or a pipeline register circuit) may be configured to have a plurality of 12-bit registers, where each of the 12-bit registers may be controlled by two clocks as shown in FIG. 1 (or may be controlled by a single clock with clock gating as shown in FIG. 3). In this example shown in FIG. 4, each of the 12-bit registers implemented in the data shifter circuit (or pipeline register circuit) has an 8-bit LSB storage partition controlled by the first clock CLK_1 and a 4-bit MSB storage partition controlled by the second clock CLK_2. When a 12-bit data sample is processed under the first condition (e.g., 12-bit depth mode), both of the first clock CLK_1 and the second clock CLK_2 are enabled, and all bit cells of each 12-bit register are in use. However, when an 8-bit data sample (which may indicate an 8-bit data sample or an 8-bit part of a 12-bit data sample) is processed under the second condition (e.g., 8-bit depth mode), only the first clock CLK_1 is enabled, and only the 8-bit LSB storage partition of each 12-bit register is in use. The power consumption associated with generation and transmission of the second clock CLK_2 can be minimized. Further, since there is no signal transition occurring at the 4-bit MSB storage partition of each 12-bit register, the power consumption of the 4-bit MSB storage partition of each 12-bit register can be reduced.

Figure 5:
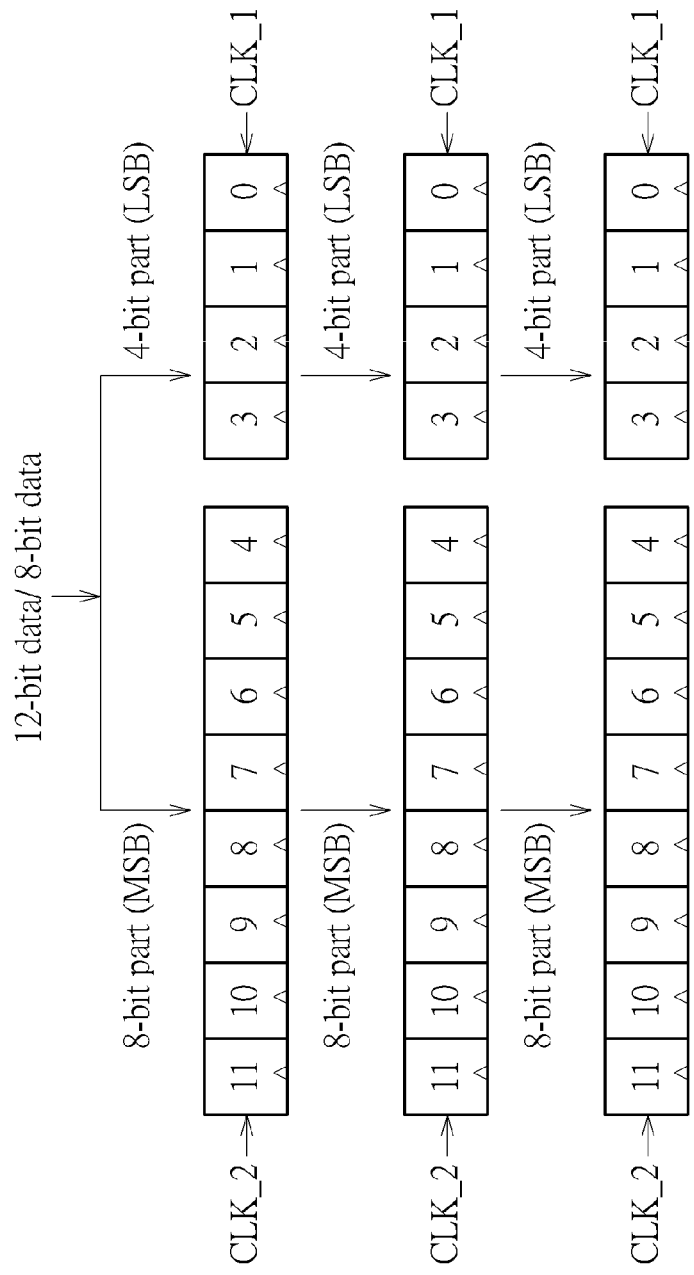
FIG. 5 is a diagram illustrating a second application using the proposed hardware design.

FIG. 5 is a diagram illustrating a second application using the proposed hardware design. In this example shown in FIG. 5, each of the 12-bit registers implemented in the data shifter circuit (or pipeline register circuit) has a 4-bit LSB storage partition controlled by the first clock CLK_1 and an 8-bit MSB storage partition controlled by the second clock CLK_2. When a 12-bit data sample is processed under the first condition (e.g., 12-bit depth mode), both of the first clock CLK_1 and the second clock CLK_2 are enabled, and all bit cells of each 12-bit register are in use. However, when an 8-bit data sample (which may indicate an 8-bit data sample or an 8-bit part of a 12-bit data sample) is processed under the second condition (e.g., 8-bit depth mode), only the second clock CLK_2 is enabled, and only the 8-bit MSB storage partition of each 12-bit register is in use. The power consumption associated with generation and transmission of the first clock CLK_1 can be minimized. Further, since there is no signal transition occurring at the 4-bit LSB storage partition of each 12-bit register, the power consumption of the 4-bit LSB storage partition of each 12-bit register can be reduced.

Figure 6:
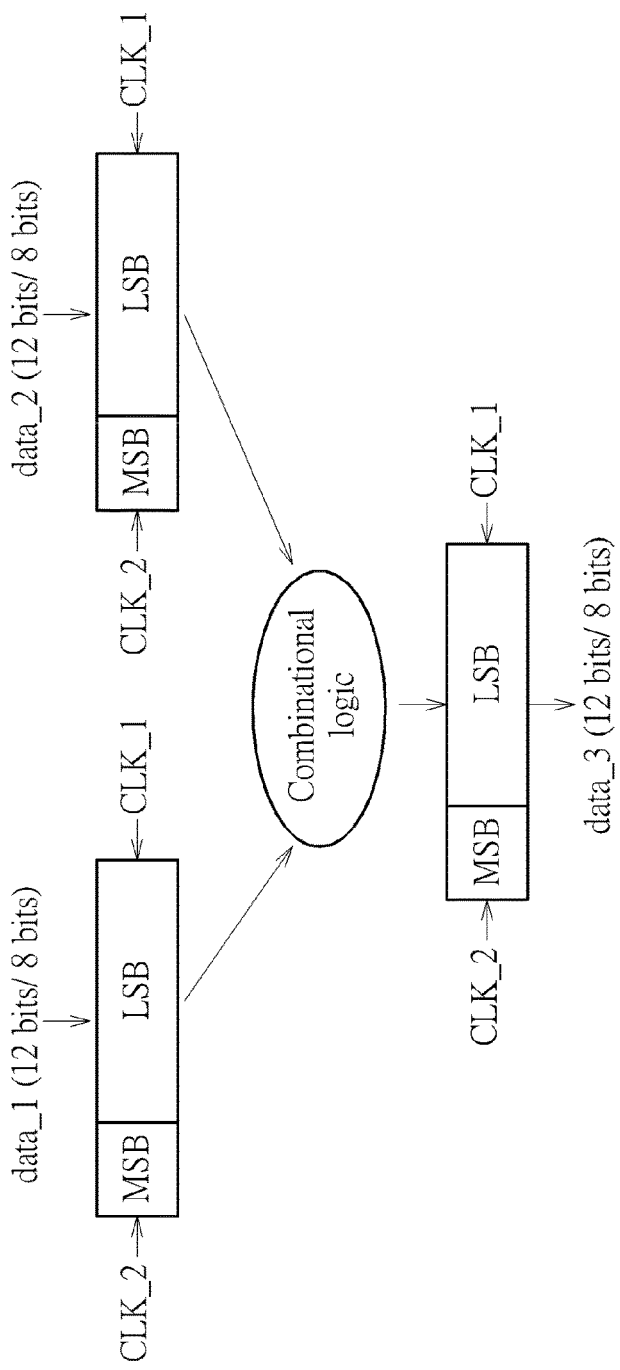
FIG. 6 is a diagram illustrating a third application using the proposed hardware design.

FIG. 6 is a diagram illustrating a third application using the proposed hardware design. One combination logic may be placed between two 12-bit registers, where each of the 12-bit registers may be controlled by two clocks as shown in FIG. 1 (or may be controlled by a single clock with clock gating as shown in FIG. 3). In this example shown in FIG. 6, the combination logic may be an adder, a multiplier, or any other type of combination logic implemented in the processing circuit 102, and each of the 12-bit registers may have an 8-bit LSB storage partition controlled by the first clock CLK_1 and a 4-bit MSB storage partition controlled by the second clock CLK_2. When 12-bit data samples are processed under the first condition (e.g., 12-bit depth mode), both of the first clock CLK_1 and the second clock CLK_2 are enabled, and all bit cells of each 12-bit register are in use. However, when 8-bit data samples (which may indicate an 8-bit data sample or an 8-bit part of 12-bit data samples, respectively) are processed under the second condition (e.g., 8-bit depth mode), only the first clock CLK_1 is enabled, and only the 8-bit LSB storage partition of each 12-bit register is in use. The power consumption associated with generation and transmission of the second clock CLK_2 can be minimized. Further, since there is no signal transition occurring at the 4-bit MSB storage partition of each 12-bit register, the power consumption of the 4-bit MSB storage partition of each 12-bit register can be reduced. In some scenarios, the embodiment illustrated in FIG. 6 may further handle sign extension for adder, multiplier, or any other type of combination logic.

Figure 7:
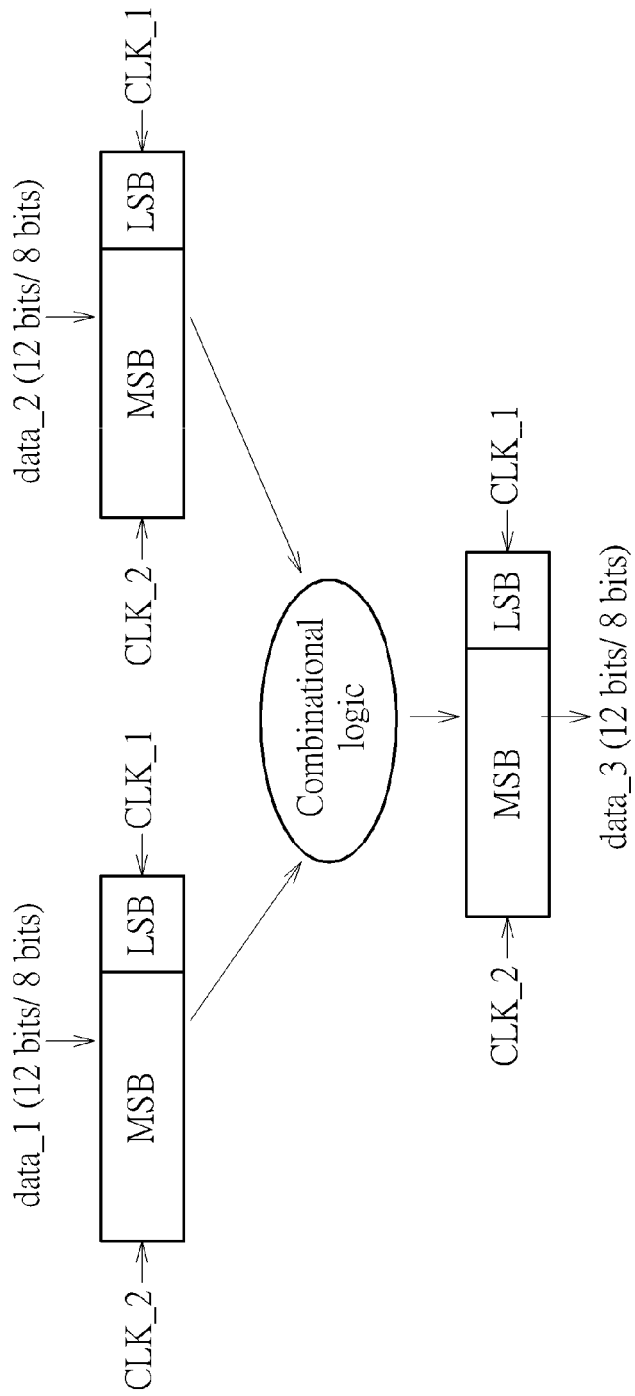
FIG. 7 is a diagram illustrating a fourth application using the proposed hardware design.

FIG. 7 is a diagram illustrating a fourth application using the proposed hardware design. In this example shown in FIG. 7, each of the 12-bit registers, which is accessed by the combination logic (e.g., adder, multiplier, or any other type of combination logic), has a 4-bit LSB storage partition controlled by the first clock CLK_1 and an 8-bit MSB storage partition controlled by the second clock CLK_2. When 12-bit data samples are processed under the first condition (e.g., 12-bit depth mode), both of the first clock CLK_1 and the second clock CLK_2 are enabled, and all bit cells of each 12-bit register are in use. However, when 8-bit data samples (which may indicate an 8-bit data sample or an 8-bit part of 12-bit data samples, respectively) are processed under the second condition (e.g., 8-bit depth mode), only the second clock CLK_2 is enabled, and only the 8-bit MSB storage partition of each 12-bit register is in use. The power consumption associated with generation and transmission of the first clock CLK_1 can be minimized. Further, since there is no signal transition occurring at the 4-bit LSB storage partition of each 12-bit register, the power consumption of the 4-bit LSB storage partition of each 12-bit register can be reduced. In some scenarios, the embodiment illustrated in FIG. 7 may be suitable for some operations, such as signed operations for adder, multiplier, or any other type of combination logic.

In each of the embodiments shown in FIG. 1 and FIG. 3, the power consumption associated with the second storage partition 105_2 in the second condition is reduced through controlling clock driving of the second storage partition 105_2. Alternatively, the power consumption associated with the second storage partition 105_2 in the second condition may be reduced through controlling a data interface of the second storage partition 105_2. For example, the same objective of reducing the power consumption in the second condition may be achieved by using a data gating technique.

Figure 8:
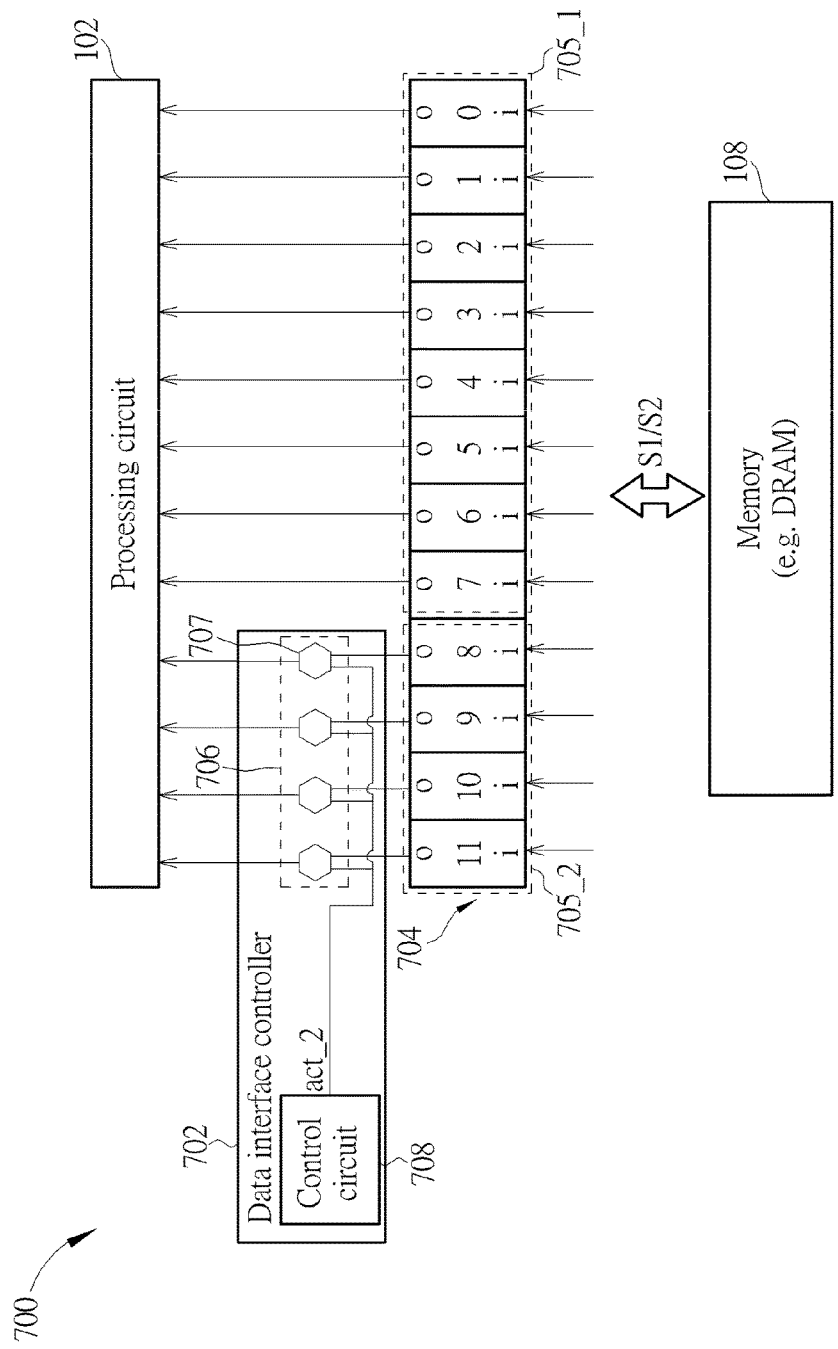
FIG. 8 is a diagram illustrating a third data processing apparatus according to an embodiment of the present invention.

FIG. 8 is a diagram illustrating a third data processing apparatus according to an embodiment of the present invention. For example, the data processing apparatus 700 may be implemented in an electronic device that needs to process data samples with different bit widths, such as a camera, a video encoder, a video decoder, a display device, a GPU, or any other device being able to process data samples with different bit widths. In this embodiment, the data processing apparatus 700 includes a data interface controller 702, a storage element 704, and the aforementioned processing circuit 102 and memory 108. For better understanding of technical features of the present invention, only one storage element 704 is illustrated in FIG. 8. In practice, the data processing apparatus 700 may have a plurality of storage elements 704. In one exemplary implementation, the processing circuit 102 and the storage element 704 may be part of a processor, where the processing circuit 102 may have a plurality of logic gates, and the storage element 704 may be a register. In another exemplary implementation, the storage element 704 may be a memory unit of an on-chip memory or an off-chip memory. For example, the processing circuit 102 and the storage element 704 may be part of a processor, where the processing circuit 102 may have a plurality of logic gates, and the storage element 104 may be part of a processor cache implemented using a static random access memory (SRAM).

As mentioned above, the processing circuit 102 is configured to process a first data sample S1 with a first bit width in a first condition and process a second data sample S2 with a second bit width in a second condition, wherein the first bit width is larger than the second bit width. In the following, it is also assumed that the first bit width may be 12 bits and the second bit width may be 8 bits. However, this is for illustrative purposes only, and is not meant to be a limitation of the present invention. Data bits of the storage element 704 are directly/indirectly loaded from the memory 108 such as a dynamic random access memory (DRAM), and then processed by the processing circuit 102. Hence, the first data sample S1 (e.g., one 12-bit data sample) may be directly read from the memory 108 (or may be obtained from a data sample which is read from the memory 108 and then processed by intermediate circuitry between the memory 108 and the storage element 704) and then loaded into the storage element 704 in the first condition (e.g., 12-bit depth mode), and the second data sample S2 (e.g., one 8-bit data sample) may be directly read from the memory 108 (or may be obtained from a data sample which is read from the memory 108 and then processed by intermediate circuitry between the memory 108 and the storage element 704) and then loaded into the storage element 704 in the second condition (e.g., 8-bit depth mode).

The storage element 704 is composed of N bit cells having M storage partitions, where N and M are positive values that may be configured based on actual design consideration. Each of the bit cells of the storage element 704 has an input data pin (denoted as "i") and an output data pin (denoted as "o"). In this embodiment, the storage element 704 may be a 12-bit register having a first storage partition 705_1 composed of 8 LSB cells and a second storage partition 705_2 composed of 4 MSB cells. In one alternative design, the storage element 704 may be a 12-bit register having a first storage partition composed of 4 LSB cells and a second storage partition composed of 8 MSB cells. In another alternative design, the storage element 704 may be a 12-bit register having more than two storage partitions. To put it simply, the number of bit cells included in the storage element 704 and the partitioning design of the storage element 704 as shown in FIG. 8 are for illustrative purposes only, and are not meant to be limitations of the present invention.

The data interface controller 702 is arranged to control signal transition at a data interface of the second storage partition 705_2. In this embodiment, the data interface is an output interface of the second storage partition 705_2. In a case where the storage element 704 is a register, the output interface may include output data bits that can be selectively gated by the proposed data interface controller 702. In another case where the storage element 704 is a memory unit such as an SRAM, the output interface may include output data bits and/or associated control signals (e.g., a write control signal, an SRAM selection signal, etc.) that can be selectively gated by the proposed data interface controller 702.

When the processing circuit 102 is configured to operate in the first condition, the data interface controller 702 enables signal transition at the output interface of the second storage partition 705_2. When the processing circuit 102 is configured to operate in the second condition, the data interface controller 702 disables signal transition at the output interface of the second storage partition 705_2. For example, the data interface controller 702 may have a data gating circuit 706 and a control circuit 708. As shown in FIG. 8, the data gating circuit 706 is arranged to receive a set of output data bits from output data pins of bit cells in the second storage partition 705_2, and selectively supply the received set of output data bits to the processing circuit 102 according to a control signal act_2 generated from the control circuit 708. In the first condition, the control circuit 708 sets the control signal act_2 for allowing the received set of output data bits to be supplied to the processing circuit 102. In the second condition, the control circuit 708 sets the control signal act_2 for blocking the received set of output data bits from being supplied to the processing circuit 102.

When the processing circuit 102 is configured to process the first data sample S1 (e.g., 12-bit data sample) in the first condition, all bit cells of the storage element 704 are in use, and the control signal act_2 is properly set to allow the received set of output data bits of the second storage partition 705_2 to be used by the processing circuit 102. In other words, all of the output data bits of the storage element 704 can be used by the processing circuit 102 in the first condition. Specifically, when the processing circuit 102 is configured to process the first data sample S1 (e.g., 12-bit data sample) in the first condition (e.g., 12-bit depth mode), the first storage partition 705_1 and the second storage partition 705_2 are both used to store data bits included in the first data sample S1. In this embodiment, 4 MSB bits of the first data sample S1 are loaded into 4 bit cells of the second storage partition 705_2, respectively; and 8 LSB bits of the first data sample S1 are loaded into 8 bit cells of the first storage partition 705_1, respectively. Further, 8 LSB bits of the first data sample S1 in the first storage partition 705_1 and 4 MSB bits of the first data sample S1 in the second storage partition 705_2 are all used by the processing circuit 102.

When the processing circuit 102 is configured to process the second data sample S2 (e.g., 8-bit data sample) in the second condition (e.g., 8-bit depth mode), only bit cells of the first storage partition 705_1 are allowed to have signal transition at the output interface of the first storage partition 705_1 due to the fact that the control signal act_2 is inactive. Specifically, in the second condition, only one of the first storage partition 705_1 and the second storage partition 705_2 is used to output stored data bits to the processing circuit 102. In this embodiment, data bits of the second data sample S2 are loaded into 8 bit cells of the first storage partition 705_1, respectively. Further, when the control signal act_2 is inactive in the second condition, each data bit at the output interface of the second storage partition 705_2 may be reset to one predetermined value (e.g., "1" or "0") to ensure that the processing circuit 102 can process the data bits in the first storage partition 705_1 correctly. In this embodiment, the data gating circuit 706 has a plurality of data gating units 707, each controlled by the control signal act_2. For example, each of the data gating units 707 may be implemented using a logic gate such as an AND gate, a NAND gate or any other logic gate. Hence, with a proper setting of the control signal act_2, an output of each data gating unit 707 can be enforced to have a predetermined value in the second condition. Since the inactive control signal act_2 can prevent signal transition at the output of the data gating circuit 706 from affecting the processing circuit 102, power consumption of related circuit can be reduced.

Figure 9:
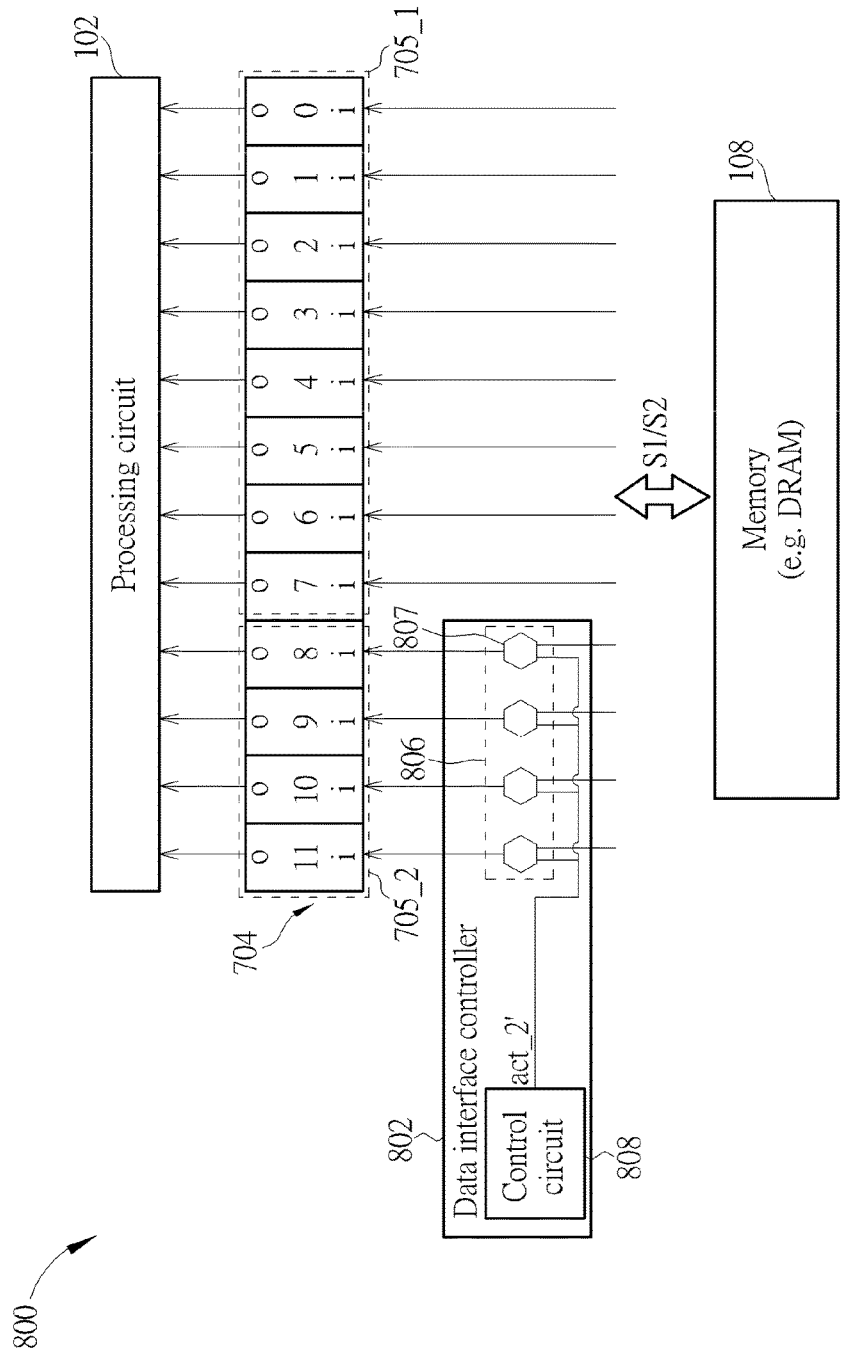
FIG. 9 is a diagram illustrating a fourth data processing apparatus according to an embodiment of the present invention.

FIG. 9 is a diagram illustrating a fourth data processing apparatus according to an embodiment of the present invention. For example, the data processing apparatus 800 may be implemented in an electronic device that needs to process data samples with different bit widths, such as a camera, a video encoder, a video decoder, a display device, a GPU, or any other device being able to process data samples with different bit widths. As shown in FIG. 9, the data processing apparatus 800 includes a data interface controller 802 and the aforementioned storage element 704, processing circuit 102 and memory 108. The data interface controller 802 is arranged to control signal transition at a data interface of the second storage partition 705_2. In this embodiment, the data interface is an input interface of the second storage partition 705_2. In a case where the storage element 704 is a register, the input interface may include input data bits that can be selectively gated by the proposed data interface controller 802. In another case where the storage element 704 is a memory unit such as an SRAM, the input interface may include input data bits and/or associated access control signals (e.g., read control signal, SRAM selection signal, etc.) that can be selectively gated by the proposed data interface controller 802.

When the processing circuit 102 is configured to operate in the first condition, the data interface controller 802 enables signal transition at the input interface of the second storage partition 705_2. When the processing circuit 102 is configured to operate in the second condition, the data interface controller 802 disables signal transition at the input interface of the second storage partition 705_2. For example, the data interface controller 802 may have a data gating circuit 806 and a control circuit 808. As shown in FIG. 9, the data gating circuit 806 is arranged to receive a set of input data bits, and selectively supply the received set of input data bits to input data pins of bit cells in the second storage partition 705_2 according to a control signal act_2' generated from the control circuit 808. In the first condition, the control circuit 808 sets the control signal act_2' for allowing the received set of input data bits to be stored into the second storage partition 705_2. In the second condition, the control circuit 808 sets the control signal act_2' for blocking the received set of input data bits from being stored into the second storage partition 705_2.

When the processing circuit 102 is configured to process the first data sample S1 (e.g., 12-bit data sample) in the first condition (e.g., 12-bit depth mode), all bit cells of the storage element 704 are in use, and the control signal act_2' is properly set to allow transmission of the received set of input data bits for the second storage partition 705_2. In other words, all of the input data bits of the first data sample S1 are received by the storage element 704 in the first condition. Specifically, in the first condition, the first storage partition 705_1 and the second storage partition 705_2 are both used to store data bits included in the first data sample S1. In this embodiment, 4 MSB bits of the first data sample S1 are loaded into 4 bit cells of the second storage partition 705_2, respectively; and 8 LSB bits of the first data sample S1 are loaded into 8 bit cells of the first storage partition 705_1, respectively.

When the processing circuit 102 is configured to process the second data sample S2 (e.g., 8-bit data sample) in the second condition (e.g., 8-bit depth mode), only bit cells of the first storage partition 705_1 are allowed to have signal transition at the input interface of the first storage partition 705_1 due to the fact that the control signal act_2' is inactive. Specifically, in the second condition, only one of the first storage partition 705_1 and the second storage partition 705_2 is used to receive data bits of the second data sample S2. In this embodiment, data bits of the second data sample S2 are loaded into 8 bit cells of the first storage partition 705_1, respectively. Further, when the control signal act_2' is inactive in the second condition, each data bit at the input interface of the second storage partition 705_2 may be reset to one predetermined value (e.g., "1" or "0") to ensure that the processing circuit 102 can process the data bits in the first storage partition 105_1 correctly. In this embodiment, the data gating circuit 806 has a plurality of data gating units 807, each controlled by the control signal act_2'. For example, each of the data gating units 807 may be implemented using a logic gate such as an AND gate a NAND gate or any other logic gate. Hence, with a proper setting of the control signal act_2', an output of each data gating unit 807 can be enforced to have a predetermined value in the second condition. Since the inactive control signal act_2' can avoid signal transition at the output of the data gating circuit 806 in the second condition, power consumption of related circuit can be reduced.

No matter whether the proposed clock-gating technique the proposed data-gating technique a power control technique, an electricity control technique or any other technique for controlling active statuses of different storage partitions is employed, the memory elements can have reduced power consumption. For example, a memory element may have an MSB storage partition and an LSB storage partition, where the MSB storage partition and the LSB storage partition are both used in the first condition, and only the MSB storage partition is used under the second condition. The memory element with such a partitioning design may be particularly suitable for certain signal processing operations, such as a rotation operation. For another example, a memory element may have an MSB storage partition and an LSB storage partition, where the MSB storage partition and the LSB storage partition are both used in the first condition, and only the LSB storage partition is used under the second condition. The memory element with such a partitioning design may be particularly suitable for certain signal processing operations, such as a rounding operation.

Figure 10:
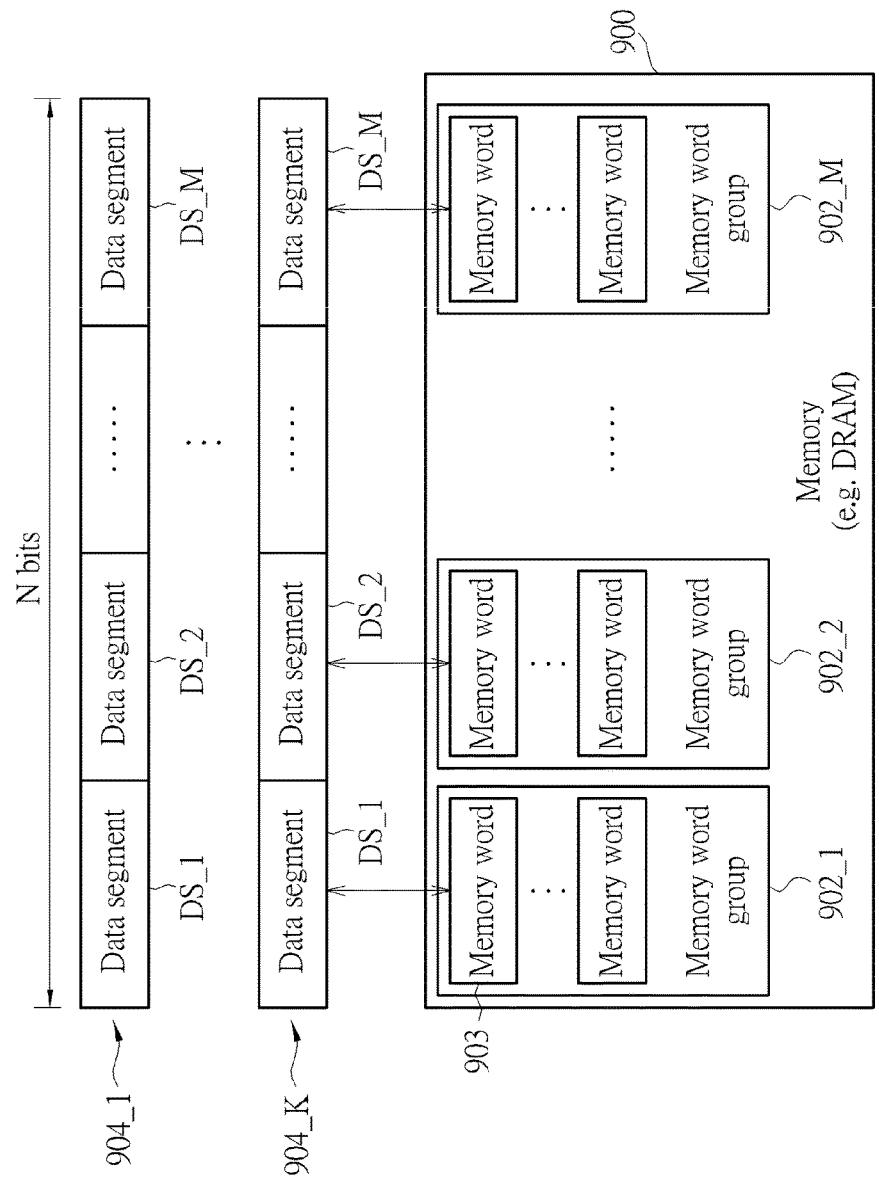
FIG. 10 is a diagram illustrating a compact memory footprint according to an embodiment of the present invention.

It is possible that an application may read a specific data sample (i.e., a complete data sample) stored in a memory in the first condition, and may read a portion of the same specific data sample (i.e., a partial data sample) stored in the memory in the second condition. In one exemplary embodiment of the present invention, the specific data sample may have a plurality of data segments, and the data segments may be stored in different memory words belonging to different memory word groups allocated in a memory (e.g., DRAM). FIG. 10 is a diagram illustrating a compact memory footprint according to an embodiment of the present invention. By way of example, but not limitation, the memory 108 shown in FIGS. 1, 2, 7 and 8 may be implemented using the memory 900 shown in FIG. 10. The memory 900 has a plurality of memory word groups 902_1-902_N, and each of the memory word groups 902_1-902_N has a plurality of memory words 903. For example, each memory word may be 32 bits.

An application may be designed to process N-bit data samples 904_1-904_K in one condition (i.e., an N-bit depth mode), and may be designed to process I-bit data samples in another condition (i.e., an I-bit depth mode), where N>I, and each of the I-bit data samples is a portion of one of the N-bit data samples 904_1-904_K. Alternatively, an application may be designed to process N-bit data samples 904_1-904_K in one condition (i.e., an N-bit depth mode), may be designed to process I-bit data samples in another condition (i.e., an I-bit depth mode), and may be designed to process J-bit data samples in yet another condition (i.e., a J-bit depth mode), where N>I>J, and each of I-bit data samples and J-bit data samples is a portion of one of the N-bit data samples 904_1-904_K.

In accordance with the actual design requirement, each of the N-bit data samples 904_1-904_K may have a plurality of data segments DS_1-DS_M. For example, each of the N-bit data samples 904_1-904_K may have two data segments (M=2). For another example, each of the N-bit data samples 904_1-904_K may have three data segments (M=3). For yet another example, each of the N-bit data samples 904_1-904_K may have more than three data segments (M>3). By way of example, a bit width of one data segment may be set by a value equal to 2 to the power of a non-negative integer (e.g., $2^0, 2^1, 2^2, 2^3, 2^4$, etc.). Hence, a 13-bit data sample may be split into an 8-bit data segment, a 4-bit data segment, and a 1-bit data segment. Alternatively, a bit width of one data segment may be set by a value equal to an integer multiple of 2 (e.g., 2, 4, 6, 8, etc.).

In one exemplary embodiment, data segments DS_1 of the same bit position in the data samples 904_1-904_K may be grouped and sequentially stored in the memory word group 902_1 for a burst access. Similarly, data segments DS_2 of the same bit position in the data samples 904_1-904_K may be grouped and sequentially stored in the memory word group 902_2 for a burst access; and data segments DS_M of the same bit position in the data samples 904_1-904_K may grouped and sequentially stored in the memory word group 902_M for a burst access.

For example, the bit width N of each of the data samples 904_1-904_K may be 12 bits, the number K of the data samples 904_1-904_K may be 64, and the number M of the data segments DS_1-DS_M may be 3. In one exemplary design, the data segment DS_1 includes data bits (data[11:8]) of a 12-bit data sample, the data segment DS_2 includes data bits (data[7:4]) of the 12-bit data sample, and the data segment DS_M includes data bits (data[3:0]) of the 12-bit data sample. Hence, data bits (data[11:8]) of 64 data samples 904_1-904_K are grouped and stored in the 32-byte memory word group 902_1, data bits (data[7:4]) of 64 data samples 904_1-904_K are grouped and stored in the 32-byte memory word group 902_2, and data bits (data[3:0]) of 64 data samples 904_1-904_K are grouped and stored in the 32-byte memory word group 902_M. One 8-4 burst (burst length=8, word=4) can be used to access any of the 32-byte memory word groups 902_1, 902_2, 902_M. In this way, the memory access latency can be effectively reduced. Further, at least two of the 32-byte memory word groups 902_1-902_M may be allocated in a continuous logic memory space of the memory 900. Consider a case where a signal processing procedure running on the processing circuit 102 requires data with less precision such as data bits (data[11:4]), it can read the memory word groups 902_1 and 902_2 in a continuous burst access. Consider another case where a signal processing procedure running on the processing circuit 102 requires data with less precision such as data bits (data[7:0]), it can read the memory word groups 902_2 and 902_M in a continuous burst access. When the proposed compact memory footprint is employed, a signal processing procedure that needs to process data samples with different bit depths can have improved performance.

Figure 11:
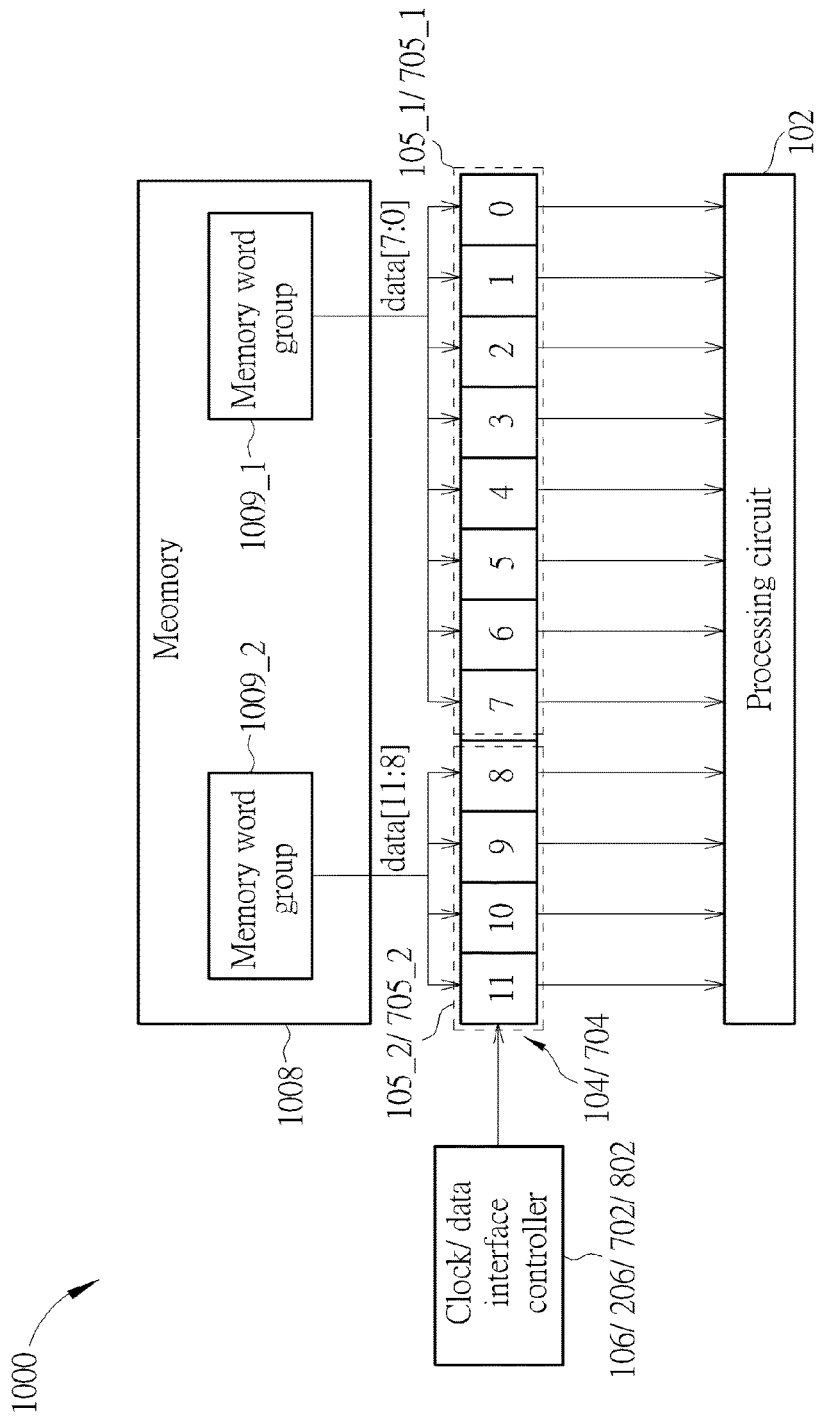
FIG. 11 is a diagram illustrating a fifth data processing apparatus according to an embodiment of the present invention.

FIG. 11 is a diagram illustrating a fifth data processing apparatus according to an embodiment of the present invention. For example, the data processing apparatus 1000 may be implemented in an electronic device that needs to process data samples with different bit widths, such as a camera, a video encoder, a video decoder, a display device, a GPU, or any other device being able to process data samples with different bit widths. In this embodiment, the data processing apparatus 1000 includes a memory (e.g., DRAM) 1008 and the aforementioned storage element 104/704, processing circuit 102 and clock/data interface controller 106/206/702/802. The memory (e.g., DRAM) 1008 may be implemented using the memory 900 shown in FIG. 10. Hence, the memory 1008 with the proposed compact memory footprint may have two memory word groups 1009_1 and 1009_2 allocated in a continuous logic memory space. The storage element 104/704 has the first storage partition 105_1/705_1 composed of 8 LSB cells and the second storage partition 105_2/705_2 composed of 4 MSB cells. In this embodiment, a complete 12-bit data sample has a first data segment (data[7:0]) and a second data segment (data[11:8]), where the first data segment (data[7:0]) is stored in the memory word group 109_1, and the second data segment (data[11:8]) is stored in the memory word group 1009_2. The complete 12-bit data sample may be the first data sample S1 to be processed by a procedure running on the processing circuit 102 under the first condition (e.g., 12-bit depth mode), and the first data segment (data[7:0]) may be the second data sample S2 to be processed by the same procedure running on the processing circuit 102 under the second condition (e.g., 8-bit depth mode). In this embodiment, the partitioning of the first data sample S1 (data[11:8]+data[7:0]) matches that of the storage element 104/704 (4 MSB cells+8 LSB cells). Hence, the data processing apparatus 1000 facilitates a simple design for supporting different bit widths.

For example, when the processing circuit 102 is configured to process the first data sample S1 in the first condition, the first data segment (data[7:0]) of the first data sample S1 is read from one memory word group 1009_1 in the memory 1008 and then written into the first storage partition 105_1/705_1 (8 LSB cells) of the storage element 104/704; and the second data segment (data[11:8]) of the first data sample S1 is read from another memory word group 1009_2 in the memory 1008 and then written into the second storage partition 105_2/705_2 (4 MSB cells) of the storage element 104/704. When the processing circuit 102 is configured to process the second data sample S2 (which is part of the first data sample S1) in the second condition, the second data sample S2 (i.e., first data segment (data[7:0]) of first data sample S1) is read from one memory word group 1009_1 in the memory 108 and then written into the first storage partition 105_1/705_1 (8 LSB cells) of the storage element 104/704, where the clock/data interface controller 106/206/702/802 is operative to apply clock-gating/data-gating to the second storage partition 105_2/705_2 (4 MSB cells) of the storage element 104/704 for reducing the power consumption.

However, when another procedure running on the processing circuit 102 requires data samples with less precision (e.g., data[11:4]), it needs to read two memory words in different memory word groups and then discard unnecessary data bits. For example, the first data segment (data[7:0]) of the first data sample S1 is read from the memory word group 1009_1, and the second data segment (data[11:8]) of the first data sample S1 is read from the memory word group 1009_2. Some data bits (data[7:4]) in the first data segment (data[7:0]) read from the memory word group 1009_2 are kept, while remaining data bits (data[3:0]) of the first data segment (data[7:0]) read from the memory word group 1009_1 are discarded. The data bits (data[7:4]) in the first data segment (data[7:0]) read from the memory word group 1009_2 and the second data segment (data[11:8]) read from the memory word group 1009_2 are merged to form a desired 8-bit data sample (data[11:4]).

Figure 12:
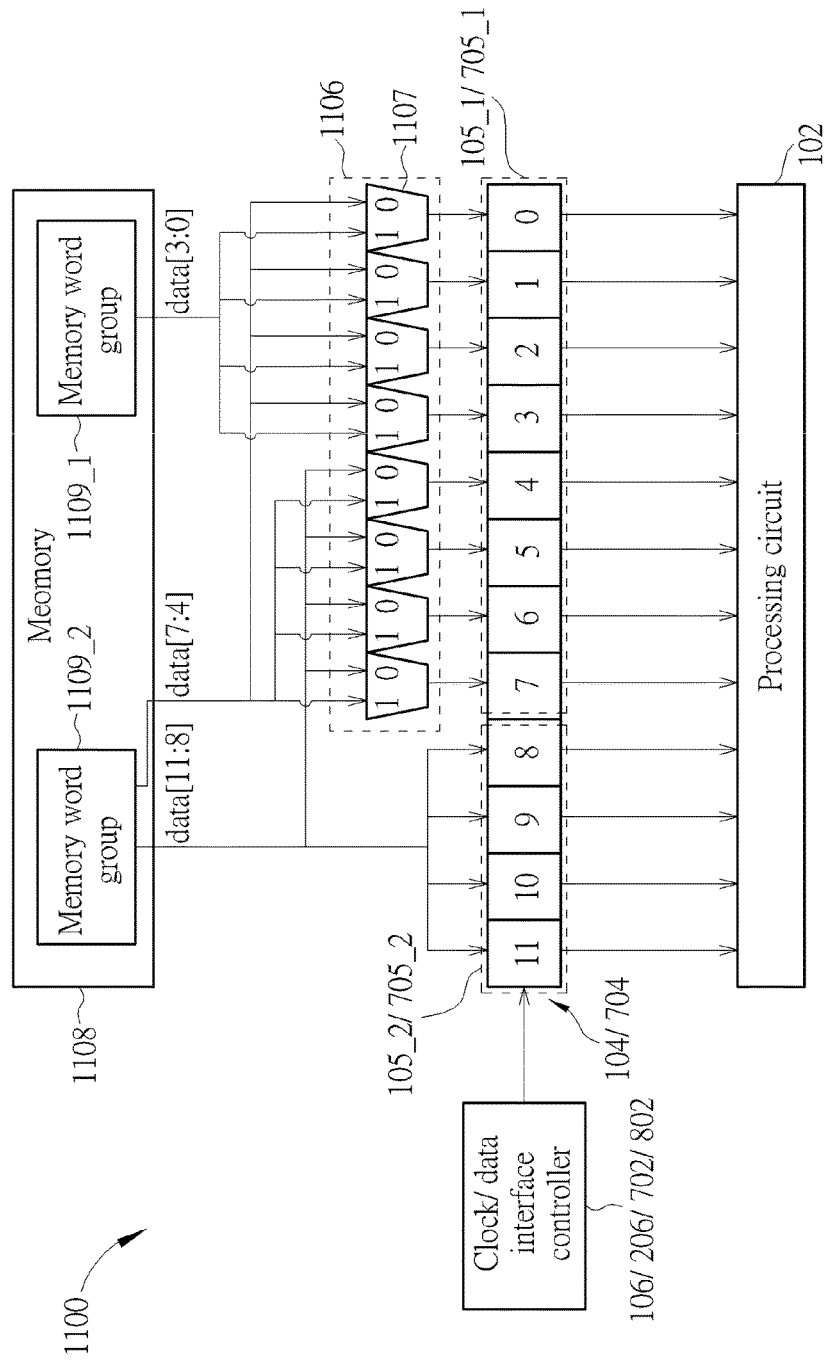
FIG. 12 is a diagram illustrating a sixth data processing apparatus according to an embodiment of the present invention.

FIG. 12 is a diagram illustrating a sixth data processing apparatus according to an embodiment of the present invention. For example, the data processing apparatus 1100 may be implemented in an electronic device that needs to process data samples with different bit widths, such as a camera, a video encoder, a video decoder, a display device, a GPU, or any other device being able to process data samples with different bit widths. In this embodiment, the data processing apparatus 1100 includes a bit selector 1106, a memory (e.g., DRAM) 1108, and the aforementioned storage element 104/704, processing circuit 102 and clock/data interface controller 106/206/702/802. The memory (e.g., DRAM) 1108 may be implemented using the memory 900 shown in FIG. 10. Hence, the memory 1108 with the proposed compact memory footprint may have two memory word groups 1109_1 and 1109_2 allocated in a continuous logic memory space.

In this embodiment, a complete 12-bit data sample has a first data segment (data[3:0]) and a second data segment (data[11:4]), where the first data segment (data[3:0]) is stored in the memory word group 1109_1, and the second data segment (data[11:4]) is stored in the memory word group 1109_2. The complete 12-bit data sample may be the first data sample S1 to be processed by a procedure running on the processing circuit 102 under the first condition, and the second data segment (data[11:4]) of the first data sample S1 may be the second data sample S2 to be processed by the same procedure or a different procedure running on the processing circuit 102 under the second condition.

In this embodiment, the partitioning of the first data sample S1 (data[11:4]+data[3:0]) does not match that of the storage element 104/704 (4 MSB cells+8 LSB cells). However, compared to the data processing apparatus 1000 that facilitates a simple design for supporting different bit depths, the data processing apparatus 1100 can facilitate less memory access for processing data samples with different bit depths. As shown in FIG. 12, the bit selector 1106 is located between an input interface between the first storage partition 105_1/705_1 of the storage element (e.g., register or SRAM) 104/704 and the memory (e.g., DRAM) 1108. As shown in FIG. 12, the bit selector 1106 includes a plurality of multiplexers 1107 coupled to the LSB cells of the first storage partition 105_1/705_1, respectively. Each of the multiplexers 1107 is used to select a data bit source for a corresponding LSB cell in the first storage partition 105_1/705_1.

For example, when the processing circuit 102 is configured to process the first data sample S1 in the first condition, the multiplexers 1107 are controlled to operate in data_mode=1. Hence, the second data segment (data[11:4]) of the first data sample S1 is split into a first portion (data[7:4]) and a second portion (data[11:8]), and the multiplexers 1107 select the first data segment (data[3:0]) of the first data sample S1 and the first portion (data[7:4]) of the second data segment (data[11:4]) of the first data sample S1 to act as input data bits stored into the first storage partition 105_1/705_1. In addition, the second portion (data[11:8]) of the second data segment (data[11:4]) of the first data sample S1 are used to act as input data bits stored into the second storage partition 105_2/705_2.

When the processing circuit 102 is configured to process the second data sample S2 (e.g., second data segment (data[11:4]) of first data sample S1) in the second condition, the multiplexers 1107 are controlled to operate in data_mode=0. Hence, the second data segment (data[11:4]) of the first data sample S1 is selected by the multiplexers 1107 to act as input data bits stored into the first storage partition 105_1/705_1, where the clock/data interface controller 106/206/702/802 is operative to apply clock-gating/data-gating to the second storage partition 105_2/705_2 (4 MSB cells) of the storage element 104/704 for reducing the power consumption.

In a case where a procedure running on the processing circuit 102 decides to use the first data sample S1 (data[11:8]+data[7:4]+data[3:0]) in a first time period and then decides to use the second data sample S2 (data[11:8]) only in a second time period, the procedure only needs to read the second data segment (data[11:4]) of the first data sample S1 from the memory word group 1109_2 in the second time period without reading the first data segment (data[3:0]) of the first data sample S1 from the memory word group 1109_1. In another case where another procedure running on the processing circuit 102 requires data with less precision (e.g., data[11:8] only), it only needs to read the second data segment (data[11:4]) of the first data sample S1 from the memory word group 1109_2 without reading the first data segment (data[3:0]) of the first data sample S1 from the memory word group 1109_1. Hence, the data processing apparatus 1100 does not need to read two memory words in different memory word groups and then discard unnecessary data bits, thus having less memory access.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A data processing apparatus comprising:
a memory, arranged to store a plurality of data samples, wherein a first data sample and a second data sample are derived from a same data sample in the data samples stored in the memory;
wherein when a processing circuit is configured to operate in a first condition to process the first data sample with a first bit width, the first data sample includes at least a first data segment derived from a first memory word of the memory and a second data segment derived from a second memory word of the memory, where the first memory word further includes a first data segment of another first data sample with the first bit width, and the second memory word further includes a second data segment of the another first data sample; and when the processing circuit is configured to operate in a second condition to process the second data sample with a second bit width, the second data sample is solely derived from a single memory word of the memory, where the single memory word further includes another second data sample with the second bit width.

2. The data processing apparatus of claim 1, further comprising:
a storage element, having a plurality of storage partitions, wherein the storage partitions comprise a first storage partition and a second storage partition;
wherein when the processing circuit is configured to operate in the first condition, the first storage partition and the second storage partition are both used to store data bits included in the first data sample; and when the processing circuit is configured to operate in the second condition, only the first storage partition is used to store data bits included in the second data sample.

3. The data processing apparatus of claim 2, further comprising:
a bit selector, arranged to select the first data segment of the first data sample and a portion of the second data segment of the first data sample to act as input data bits stored into the first storage partition when the processing circuit is configured to operate in the first condition.

4. The data processing apparatus of claim 3, wherein the bit selector is further arranged to select the second data sample to act as input data bits stored into the first storage partition when the processing circuit is configured to operate in the second condition.

5. The data processing apparatus of claim 1, wherein each of the data samples has at least a first data segment and a second data segment; first data segments of a same bit position in the data samples are grouped and sequentially stored in the first memory word group; and second data segments of a same bit position in the data samples are grouped and sequentially stored in the second memory word group.

6. The data processing apparatus of claim 5, wherein the first memory word group and the second memory word group are allocated in a continuous logic memory space.

7. A data processing method comprising:
utilizing a memory to store a plurality of data samples, wherein a first data sample and a second data sample are derived from a same data sample in the data samples;
when a processing circuit is configured to operate in a first condition to process the first data sample with a first bit width, deriving a first data segment of the first data sample from a first memory word of the memory and deriving a second data segment of the first data sample derived from a second memory word of the memory, where the first memory word further includes a first data segment of another first data sample with the first bit width, and the second memory word further includes a second data segment of the another first data sample; and
when the processing circuit is configured to operate in a second condition to process the second data sample with a second bit width, deriving the second data sample from only a single memory word of the memory, where the single memory word further includes another second data sample with the second bit width.

8. A data processing apparatus comprising:
a memory, arranged to store a plurality of data samples, wherein a first data sample and a second data sample are derived from a same data sample in the data samples stored in the memory; when a processing circuit is configured to operate in a first condition to process the first data sample with a first bit width, the first data sample includes at least a first data segment derived from a first memory word of the memory and a second data segment derived from a second memory word of the memory, where the first memory word further includes a first data segment of another first data sample with the first bit width, and the second memory word further includes a second data segment of the another first data sample; and when the processing circuit is configured to operate in a second condition to process the second data sample with a second bit width, the second data sample is solely derived from a single memory word of the memory, where the single memory word further includes another second data sample with the second bit width;

a storage element, having a plurality of storage partitions, wherein the storage partitions comprise a first storage partition and a second storage partition, wherein when the processing circuit is configured to operate in the first condition, the first storage partition and the second storage partition are both used to store data bits included in the first data sample; and when the processing circuit is configured to operate in the second condition, only the first storage partition is used to store data bits included in the second data sample; and a bit selector, arranged to select the first data segment of the first data sample and a portion of the second data segment of the first data sample to act as input data bits stored into the first storage partition when the processing circuit is configured to operate in the first condition.

* * * * *